Oct. 9, 1934.  E. R. CHILD  1,976,482
SLOT AND FLAP COMBINATION
Filed March 24, 1932  2 Sheets-Sheet 1
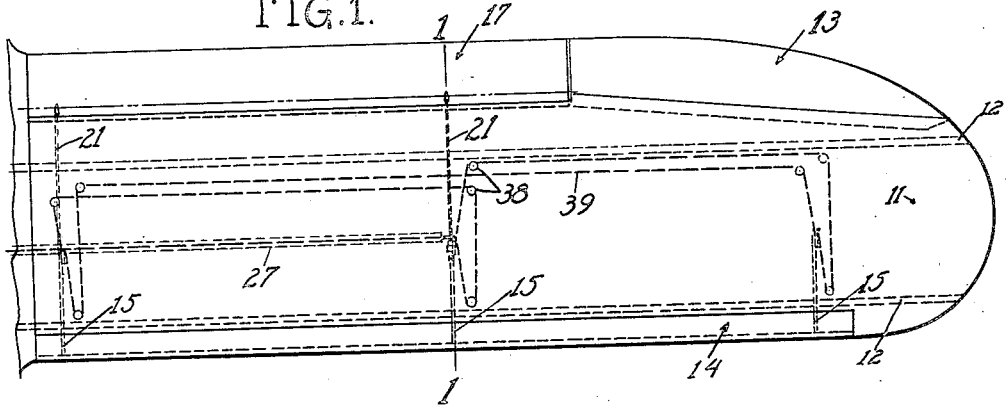
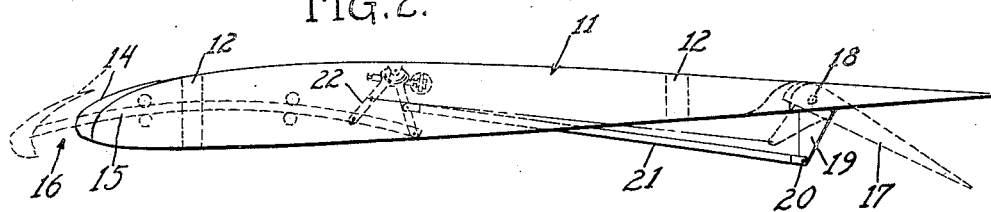
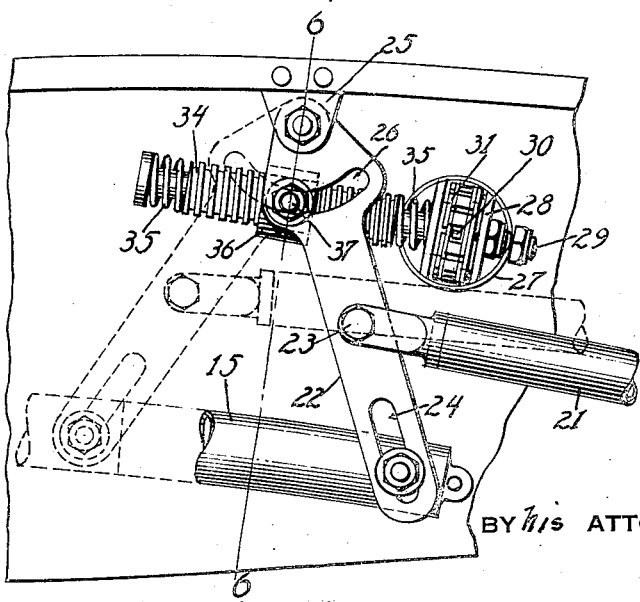
INVENTOR
EDWARD RUSHMORE CHILD.
BY his ATTORNEY Oct. 9, 1934.   E. R. CHILD   1,976,482
SLOT AND FLAP COMBINATION
Filed March 24, 1932   2 Sheets-Sheet 2
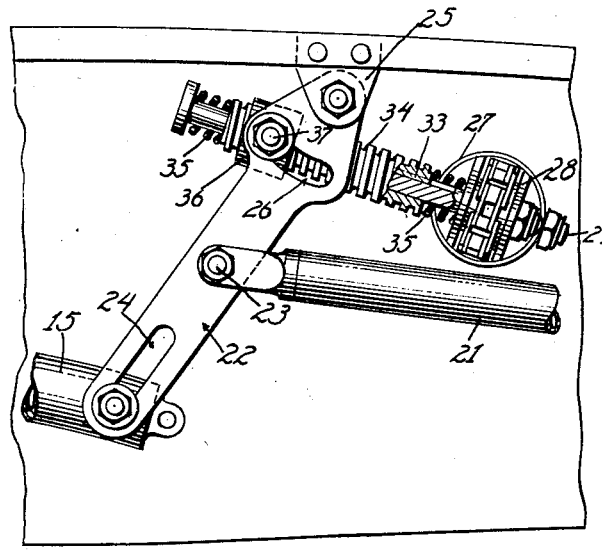
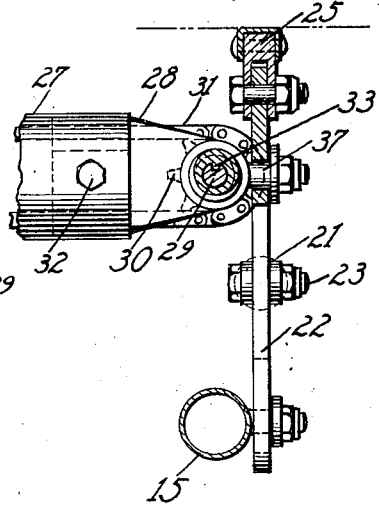
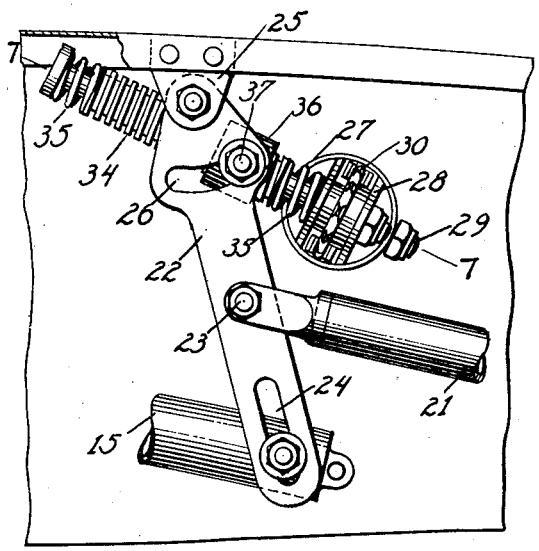
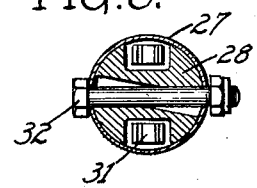
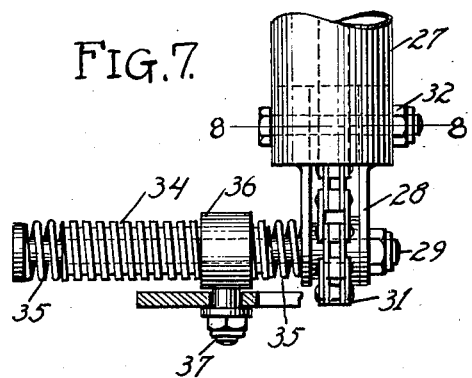
INVENTOR
EDWARD RUSHMORE CHILD.
BY his ATTORNEY Patented Oct. 9, 1934

1,976,482

UNITED STATES PATENT OFFICE 1,976,482

SLOT AND FLAP COMBINATION

Edward R. Child, Tonawanda, N. Y., assignor to Curtiss Aeroplane & Motor Company, Inc., a corporation of New York Application March 24, 1932, Serial No. 600,849

9 Claims. (Cl. 244—12)

My invention relates to airplanes and is concerned more particularly with means for controlling flaps and slots on the wings of airplanes. There have been various devices built and patents issued on devices known as slots and flaps in connection with the wings of an airplane. Slots are commonly referred to as openings near the leading edge of a wing to allow air to pass from the leading edge of the wing to the upper surface of the wing, and in certain positions of the airplane with respect to the windstream, serve to improve control and performance. Likewise, flaps as differentiated from ailerons, have been applied to aircraft with the object of increasing the camber of the wing in order to attain high lift conditions, particularly at low air speeds. The slots mentioned above are usually formed by small auxiliary airfoils adjustable with relation to the leading edge of the wing. These auxiliary airfoils are mounted in such a way that they may be retracted or extended, and in the extended position form a slot. Usually, these slots are automatic in their action. When a wing reaches a certain high angle of attack, the auxiliary airfoil is caused to extend by the suction of the air created on its surface. Usually, the flaps applied to airplane wings are manually operated and may be adjusted downward by the pilot to cause a change in camber of the wing surface to attain slow landing speeds.

An object of my invention is to connect the auxiliary airfoils and the flaps together so that when high angles of attack are reached, the slot opens automatically and through its connection with the flap, the flap also is depressed.

An additional object of my invention is to provide control means whereby the auxiliary airfoil and the flap may be locked in a closed or normal position, or may be locked in an open position, or may be neutralized so that the slot and flap combination may open or close automatically. To the best of my knowledge these objectives have never before been attained. Auxiliary airfoils have been devised which open automatically and have been arranged so that they may be locked in the open position or in the closed position. Flaps have been devised which may be locked in a depressed or normal position.

On the Curtiss "Tanager", Serial No. 436,937, filed March 19, 1930, the slot opens automatically when the wing reaches a certain angle of attack, but the flap is operated manually by the pilot. On the Handley-Page "Gugnunc", i. e., an airplane built by Handley-Page of England and operated in this country in 1929, the auxiliary airfoil and the slot were interconnected, so that when the slot opened the flap was pulled down, thus making the operation entirely automatic. The purpose of my invention is to combine the best features of both methods of operation.

There are obvious advantages in having the slot and flap interconnected, making the flap as well as the slot automatic. In general, such an arrangement gives the pilot less work to do and less to think about. He is relieved of the necessity of cranking the flaps down in order to make a landing at minimum speed. This would be particularly desirable in making a forced landing. Another advantage, applying particularly to military airplanes, of having completely automatic action is that the minimum radius of turn of an airplane in (1) making a vertical bank, (2) pulling out of a glide or dive, or (3) making a loop or part of a loop, is determined by the amount of lift which can be obtained from the wings. (The lift of the wings is balanced against the centrifugal force caused by the weight of the airplane, with the result that the minimum radius of turn is a direct function of the stalling speed.) Thus, in order to have maximum maneuverability, it is necessary that both the slot and the flap come into action automatically when the angle of attack of the wings is increased. Obviously, it will not be possible for the pilot of a military airplane to crank the flaps down when he wants to make a "tight" turn or similar maneuver. But, if the flaps are in the "up" position, he will be losing lift, and hence losing ability to "pull himself around".

There are also advantages in having manual control of the slot and flap. The ability to crank the flaps down before taking off reduces the take-off run. In taxiing down-wind, it is desirable to lock the slots closed and the flaps up. In performing certain maneuvers required of military airplanes, such as spins, it will be desirable (and perhaps necessary) to have the slots and flaps inoperative.

By my invention I am able to control the opening of the slot and the depression of the flap in such a way that disadvantageous positions of the slots and flaps may be avoided under certain maneuvering conditions by locking them in a normal position, and certain advantages are attained, such as in take-off and landing when the slot and flap combination may be locked so that the auxiliary airfoil is extended forming a slot and the flap is depressed. Under normal flight conditions, this control may be neutralized, and if by an inadvertent maneuver the airplane may be thrown into an attitude wherein the slots and flaps are needed for additional safety, they will come into action automatically and possibly prevent a stall, a spin, or other undesirable action.

Another object of my invention is to provide a novel form of operating mechanism to attain the objects set forth above, which is simple and effective, easily manufactured and cheap to produce.

A still further object of my invention is to provide improved cushioning means in this operating mechanism whereby the sudden rapid extension of the auxiliary airfoils will be cushioned against the main part of the wing to which they are attached, thus obviating possible fracture of parts and increasing their life.

Other objects and advantages of the invention will be apparent from a reading of the subjoined specification and claims and from a consideration of the accompanying drawings.

In the drawings, wherein like reference characters denote like parts,

Fig. 1 is a plan of an airplane wing embodying certain features of my invention;

Fig. 2 is a section on the line 1—1 of Fig. 1;

Figs. 3, 4 and 5 show in detail corresponding parts of the operating mechanism of Fig. 2 in different positions of adjustment;

Fig. 6 is a section on the line 6—6 of Fig. 3;

Fig. 7 is a section on the line 7—7 of Fig. 5 with parts in elevation; and

Fig. 8 is a section on the line 8—8 of Fig. 7.

In the embodiment of my invention chosen for illustration, an airplane wing 11 embodying the usual spars 12 and aileron 13, has at its leading edge an auxiliary airfoil 14 mounted on suitable supporting means 15 which allow it to extend slightly forward and downward of the wing 11 thus forming a slot 16 between the auxiliary airfoil 14 and the wing 11. To the trailing edge of the wing 11 is pivotally attached a flap 17, pivoted at points 18 to allow of movement about said points 18. To the flap 17 is attached a control arm 19, depending downward and having at its lower end a pivot 20. From the pivot 20, a control arm 21 is carried forward into the wing and is pivoted to a lever 22 at the point 23 by means of a suitable clevis and pin. The supporting arm 15 for the auxiliary airfoil 14 is likewise pivoted to the lever 22. In the embodiment shown, the arm 15 is pivoted to the lever 22 through a slot 24 in the lever 22. The lever 22 is pivoted to a bracket 25 attached rigidly to the wing 11. It will be seen thus far, that when the auxiliary airfoil 14 is moved forward, a pull is exerted through the arm 15 on the lever 22. The lever 22, pivoting on the bracket 25, pulls the arm 21, thus causing depression of the flap 17. The mechanism thus far is all that might be required for combined automatic action of the auxiliary airfoil and flap. As the angle of attack against the wing 11 increases, a suction is produced on the upper surface of the auxiliary airfoil 14, thus pulling it forward. Correspondingly, the flap 17 is depressed and the effect of the airfoil then becomes similar to an airfoil having a longer chord and a higher lift coefficient. As the angle of attack may again become low, the pressure on the front of the auxiliary airfoil 14 and likewise the pressure on the under surface of the flap 17 will cause the two to retract into their normal position, thus giving the effect of a low camber high speed airfoil section.

The automatic means comprising part of my invention, to constrain the slot and flap in extended or retracted positions, is shown in detail in Figs. 3 to 8. A slot 26 is formed in the lever 22. This slot is shown arcuate in form. From the root of the wing 11, transversely through the wing, is extended a tube 27. In the outer end of the tube 27 is located a bracket 28 free to rotate within the tube 27 and having formed at its outer end a bearing for the shaft 29, extending at right angles from the axis of the tube 27. On the shaft 29, within the confines of the bearing bracket is fixed a sprocket 30 about which passes a chain 31, the chain 31 passing through the tube 27 to a suitable sprocket and hand crank (not shown), accessible to the pilot. Fig. 8 shows how the bracket 28 may revolve within the tube 27, but is limited in its motion by a slot cut in said bracket and by a retaining bolt 32 passing through the tube and through the slot in the bracket.

The shaft 29, external of the bracket 28, has cut therein a key-way 33. A threaded sleeve 34, slides longitudinally over the shaft 29, having a key in its bore engaging in the key-way 33, but is constrained in its movement by springs 35 which serve as cushions. Turning of the shaft 29 likewise will cause turning of the threaded sleeve 34. Upon the sleeve 34 is screwed a nut 36 having formed thereon a pivot 37 engaging in the slot 26 in the lever 22.

It will now be apparent that translating the chain 31 through the tube 27 causes rotation of the sprocket 30, of the shaft 29 and of the threaded sleeve 34, thereby causing translation of the nut 36 along the threaded sleeve 34.

Fig. 3 shows the nut 36 in a central position with respect to the threaded sleeve 34. In such position, the lever 22 is shown in solid lines in a rearward position, wherein the auxiliary airfoil 14 would be in its closed position and the flap 17 would be in its normal position in line with the wing. Through the medium of the slot 26, movement of the lever 22 forward is permissible should the angle of attack of the wing 11 become great enough to extend the auxiliary airfoil 14 to form the slot 16. The slot would simply move against the pivot 37 and would reach its limit of travel in the position shown by the dotted lines in Fig. 3. Should the motion of the auxiliary airfoil and of the flap be sudden, the forward spring 35 would absorb the shock of stopping the motion of the lever 22. When the airfoil reaches a normal angle of attack and the auxiliary airfoil is thrown back against the wing, the lever 22 will slide rearwardly along the slot 26 and the shock of impact would likewise be taken up on the rearward spring 35.

Fig. 4 shows the position of the control mechanism when the auxiliary airfoil is locked in an extended position and likewise when the flap is depressed. To attain such locking, the chain 31 is translated, turning the threaded sleeve 34 and causing the nut 36 to move forwardly along the threaded sleeve. The pivot 37 during such translation engages the forward end of the slot 26, pulling the lever 22 forward and thus extending the auxiliary airfoil and depressing the flap. In this position, it is impossible for the auxiliary airfoil to close of its own accord and likewise impossible for the flap to regain its normal position.

By translating the chain 31 in the opposite direction, the threaded sleeve 34 causes translation of the nut 36 to its rearward end as shown in Fig. 5; thus the pivot 37 engages the rear end of the slot 26, pulling it rearwardly and causing closure of the slot 16 and leveling of the flap 17. In the position shown in Fig. 5, the slot is locked closed and the flap is locked in normal position. By again translating the chain 31 to allow the nut 36 to move midway of the threaded sleeve 34, the slot and flap are again free to move to either the open or closed position automatically.

Should the auxiliary airfoil 14 and the flap 17 be of considerable span, it is possible to duplicate the supporting and actuating arms 15 and 21 and the lever 22, to support the surfaces at several points. It is not necessary to duplicate the operating mechanism involving the threaded sleeve and chain, etc. By a system of pulleys 38 and cables 39, (diagrammatically shown in Fig. 1) it is possible to transfer the motion of the controlled lever 22 to the dependent additional levers, thus positively controlling the action of the auxiliary airfoil 14 and the flap 17 at several points along their lengths.

An airplane equipped with the devices and controlling means as set forth herein is given a universality of speed range from high to low speed conditions, while still retaining automatic features of slots and flaps which give inherent safety and with the additional ability to control these flaps and slots in maneuvers when their action is not desirable.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an airplane, a wing having a slot formed therein, means for opening and closing said slot, said slot means being adapted to operate automatically under certain flight conditions, an adjustable flap adjacent the trailing edge of said wing, means connecting said slot means with said flap permitting a coacting opening of said slot and a depression of said flap, and a manual control means operable to lock and release said slot means in either an open or closed position regardless of the initial position of said slot means.

2. In an airplane, a wing, an auxiliary airfoil adjacent to and extendible with respect to said wing to form a slot adjacent its leading edge, and adapted to extend and retract automatically under certain flight conditions, an adjustable flap adjacent the trailing edge of said wing, means connecting said auxiliary airfoil with said flap permitting a coacting extension of said auxiliary airfoil and a depression of said flap, and a manual control means selectively operable to move and lock said auxiliary airfoil in an extended position, to move said auxiliary airfoil to a retracted position, and to release said auxiliary airfoil.

3. In an airplane, a wing having a slot formed therein, means for opening and closing said slot, an arm attached to said slot means, a member movable both with and with respect to said arm, means for moving said member, and resilient stops cooperating in the line of movement of said member.

4. In an airplane, a wing having a slot formed therein, means for opening and closing said slot, a lever movable both with and with respect to said means, a threaded shaft revoluble with respect to said wing, means for revolving said shaft, and a nut embracing and movable along said threaded shaft and having formed thereon a pivot, said pivot engaging said lever.

5. In an airplane, a wing having a slot formed therein, means for opening said wing slot, a lever pivoted within said wing and pivoted to said means and having formed therein a slot, a keyed shaft revoluble with respect to said wing, stops at the ends of said shaft, a threaded sleeve embracing said keyed shaft slidable thereon longitudinally and revoluble therewith, resilient means between the ends of said shaft and said sleeve, a nut embracing said threaded sleeve and having formed thereon means to slidably engage said lever slot, and means for turning said shaft.

6. In an airplane, a wing having a slot formed therein, means for opening said wing slot, a lever pivoted within said wing and pivoted to said means and having formed therein a slot, a keyed shaft revoluble with respect to said wing, stops at the ends of said shaft, a threaded sleeve embracing said keyed shaft slidable thereon longitudinally and revoluble therewith, resilient means between the ends of said shaft and said sleeve, a nut embracing said threaded sleeve and having formed thereon means to slidably engage said lever slot, means for turning said shaft, additional levers, additional arms connecting said slot means with said additional levers, and means connected with said first mentioned lever correlating the movement of said additional levers with said first mentioned lever.

7. In an airplane wing, in combination, an auxiliary lift increasing device movable with respect to said wing and adapted under certain flight conditions to automatically move from and to positions wherein the lift of said wing is increased, a member carried by said device and extending within said wing, and control means for positively moving said device from and to positions of increased wing lift, said control means having a lost motion connection with said member to permit automatic operation of said device in certain positions of adjustment of said control means.

8. In an airplane wing, in combination, an auxiliary lift increasing device movable with respect to said wing and adapted under certain flight conditions to automatically move from and to positions wherein the lift of said wing is increased, cushioning means associated with said device for absorbing shocks which might be imposed thereon by virtue of said automatic movement and control mechanism for selectively moving said device from and to positions of increased wing lift, said mechanism having a lost motion connection with said device to permit automatic operation thereof in certain positions of adjustment of said mechanism.

9. In an airplane, a wing having means for forming a slot adjacent the leading edge thereof, said means being automatically operable under certain flight conditions, and manual means for controlling the opening and closing of said slot comprising a member movable with said slot forming means, spaced stops on said member, and means translatable between the extreme positions of said stops, said translatable means being adjustable to a position to permit free automatic operation of said slot forming means, to a position wherein said translatable means bears against one said stop to hold said slot open, and to a position wherein said translatable means bears on the other said stop to hold said slot closed.

EDWARD R. CHILD.